Patented June 12, 1928.

1,673,421

UNITED STATES PATENT OFFICE.

EARNEST J. PETRIE AND GEORGE R. HANNAN, OF LOS ANGELES, CALIFORNIA.

BATTERY.

No Drawing.   Application filed March 10, 1926. Serial No. 93,785.

This invention relates to electric storage batteries, and it is the object of the invention to provide improved means for carrying the electrolyte of the battery in suspension and separating the positive and negative plates of the battery.

It has been heretofore proposed to pack the spaces between and around the plates of a battery with a medium functioning as a separator and an absorbent for the liquid electrolyte; and diatomaceous earth, either in its natural state or dried, has been used for this purpose.

Diatomaceous earth, otherwise known as tripoli or kieselguhr, and sometimes incorrectly termed infusorial earth, consists of a siliceous deposit of the shells of diatoms occurring in friable masses or earthy form, and is particularly adaptable as an absorbent for the electrolyte of a storage battery, due to its porosity and light weight, its great absorbing properties, and the fact that it is not affected by heat or cold nor subject to decomposition, decay, or any physical change with time.

As a result of these characteristic properties of diatomaceous earth, its use as an absorbent for the electrolyte of a storage battery reduces internal resistance so as to maintain a substantially constant difference of potential between the terminals of the battery, and practically eliminates polorization caused by evolution of gases at the electrodes, and also reduces evaporation of the electrolyte and tends to prevent buckling or shedding of the plates.

These advantages result from the permeability of the diatomaceous earth which causes low resistance, the porosity of the substance which permits free passage of gases while preventing acid spraying, and the absorptive qualities of the material which carry away accumulation of gases at the plates and also maintain the electrolyte in suspension so as to reduce evaporation and expose the electrolyte to all portions of the plate surfaces in order to prevent hardening of the plates and reduction in capacity of the battery. The light weight of diatomaceous earth together with its high absorptive properties also permits practically the entire spaces between and around the plates of a battery to be filled with the material, since it will absorb sufficient electrolyte to in no way reduce the capacity of the battery, and creates practically no increase in its weight, and at the same time provides a packing between the plates which holds the active material in place so as to prevent shedding, and which also resists the pressure exerted by a plate attempting to buckle so as to overcome such warping tendency.

The foregoing advantages of diatomaceous earth as an absorbent for an electrolyte are well known and have been utilized in the construction of batteries, the diatomaceous earth being ground and used in its natural state, or being impregnated with an electrolyte after being first dried of all moisture; but such use of natural or simply dried diatomaceous earth has not resulted in maximum efficiency, due to the tendency of the material to become agglomerated, thereby reducing its porosity and permeability with a consequent reduction in its absorptive properties.

Agglomeration of the diatomaceous earth is believed due to the fact that while such material is almost entirely hollow siliceous shells of diatoms, chemical analysis of the material reveals not only silica and moisture, but an appreciable quantity of organic matter and traces of such substance as lime, magnesia, iron oxide and alumina. The hollow tubular shells of diatoms maintain their microscopic cellular construction even when ground, and the material therefore tends to retain its porosity, but it is believed that the presence of organic matter and traces of other substances in the chemical composition, accounts for the tendency of the microscopic shells to unite when packed tightly and thereby form a somewhat agglomerated mass in which although a high degree of permeability is retained, maximum porosity is lost.

It is also apparent that the presence of moisture in the natural diatomaceous earth reduces its absorptive properties so that it is not of maximum efficiency as a medium for carrying an electrolyte in suspension; and while it has been heretofore proposed to correct this condition by first heating the natural earth so as to dry it of all moisture, such a heating temperature which is only approximately 100 degrees C., is not sufficient to in any way alter the chemical composition or destroy organic matter in the diatomaceous earth, and consequently simply drying the material does not obviate its tendency to become agglomerated.

We have discovered that if the natural diatomaceous earth is so heated as to not only dry it of moisture, but also drive off all volatile constitutents and cause oxidation of certain of the constituents other than silica, including complete destruction of all organic matter, the resulting calcined product may be ground and packed without the formation of such a compact or agglomerated mass as to prevent the free permeation of gases, while at the same time providing a sufficiently close contact of the granular cells which constitute the diatomaceous earth, to prevent the passage of the metallic oxids which in storage batteries travel from one pole to the other.

The heat utilized for calcining the diatomaceous earth is approximately 2,000 degrees F. in order to calcine the material at a low red heat which is not sufficient to cause fusion, but which is sufficiently in excess of simply a drying heat to reduce the earth to substantially pure silica free of all foreign constituents but retaining its microscopic form of hollow tubular shells. The calcined earth is preferably ground to from 40 to 80 mesh which produces a finely divided mass without destroying its cellular structure.

The diatomaceous earth, as a result of calcining and grinding, is of a finely divided granular form showing microscopic, hollow, tubular cells, with the granular particles incapable of uniting in an agglomerated or paste-like mass, but retaining their integrity so as to form distinct, minute interstices extending in all directions through the earth.

The calcined earth is therefore of maximum porosity and permeability having the highest degree of absorptive properties with the pores or interstices of extremely minute size. A maximum quantity of an electrolyte may thus be absorbed and held in suspension for greatest capacity of a battery; and properly maintaining the electrolyte in suspension prevents stratification of the acid and consequently reduces loss of capacity, and also obviates the possibility of freezing.

The increased porosity of the calcined earth provides for maximum circulation of the gases and thereby prevents acid spraying and also insures efficient heat radiation so as to maintain a relatively cool battery; and the fact that calcined diatomaceous earth does not pack into an agglomerated mass prevents the formation of gas pockets.

The formation of granular cells as a result of the calcining, whereby the particles retain their integrity even when packed, produces a homogeneous structure with pores so minute that the oxids and metallic particles carried along by the charging and discharging action of the battery are unable to penetrate; and consequently "treeing" is prevented since there can be no bridging of the plates by metallic deposits.

Furthermore the diatomaceous earth being in minute granular form, permits of it being tightly packed between the plates of a battery without loss of porosity, while at the same time holding the active material in place so as to prevent shedding, and resisting pressure in the battery so as to eliminate buckling of the plates.

Calcining of the diatomaceous earth to produce a granular structure, also increases its specific gravity by the change from a light, flaky medium to a more dense and homogeneous substance, and as a consequence the use of the calcined earth as an absorbent for an electrolyte provides a highly efficient separator for the plates of a battery.

It will thus be seen that the use of calcined diatomaceous earth as an absorbent for the electrolyte of a battery, rather than using the natural or merely dried earth, provides for increased efficiency by the chemical change to substantially pure silica of microscopic cellular structure. The calcined earth therefore forms a granular material adapted to pack to a homogeneous mass without becoming agglomerated or of a paste-like constituency and retaining the identity of the individual cells so as to insure minute pores between the granular particles; and as a consequence the calcined earth is of maximum porosity and permeability with high absorptive properties, so that it is particularly adapted for use as an absorbent for the electrolyte of a storage battery.

We claim:

1. An absorbing medium for the electrolyte of a storage battery comprising shells of diatoms freed of substantially all foreign matter but retaining their microscopic cellular structure as a result of prior heating to a temperature which is in excess of drying temperature and sufficient to drive off volatile constituents and destroy organic matter but which constantly remains below minimum temperature which will cause any fusion of the diatoms.

2. An absorbing medium for the electrolyte of a storage battery formed from diatomaceous earth which has been freed of substantially all foreign matter but retaining its microscopic cellular structure as a result of prior heating to a temperature which is in excess of drying temperature and sufficient to drive off volatile constituents and destroy organic matter but which constantly remains below minimum temperature which will cause any fusion of the diatomaceous earth.

3. An absorbing medium for the electrolyte of a storage battery comprising shells of diatoms freed of substantially all foreign matter but retaining its microscopic cellular structure as a result of prior heating to approximately 2,000 degrees F. which is in excess of drying temperature and sufficient to drive off volatile constituents and destroy organic matter but which is below minimum temperature which will cause any fusion of the diatoms.

In testimony whereof they have affixed their signatures to this specification.

EARNEST J. PETRIE.
GEORGE R. HANNAN.